United States Patent

[11] 3,610,771

[72] Inventor  Warren W. Waters
              Rte. 3, Box 252, Wichita Falls, Tex. 76308
[21] Appl. No. 854,710
[22] Filed     Sept. 2, 1969
[45] Patented  Oct. 5, 1971

[54] METHOD OF AND APPARATUS FOR DETECTING IRREGULARITIES IN A SURFACE
7 Claims, 7 Drawing Figs.
[52] U.S. Cl. .................................................... 401/9,
                                              401/88, 401/34
[51] Int. Cl. ..................................................... B43k 23/00
[50] Field of Search.......................................... 401/9–11,
              49, 88, 261–267, 26; 15/250.01–250.03; 33/9

[56] References Cited
UNITED STATES PATENTS
985,508  2/1911  Buchsbaum.................. 33/9

Primary Examiner—Lawrence Charles
Attorney—Wayland D. Keith

ABSTRACT: A marking device for marking irregularities on rigid surfaces, whether plane, convex or concave, to enable the irregularities to be corrected. One of the uses in on contoured sheet metal rigid surfaces, such as vehicle bodies, where the marking media is deposited on the high spots and around the depressions to enable an artisan to ascertain such irregularities. Provision is made to have marking media on each side of a flexible, elongated element, which doubles the normal useful life of the marking device. Further provision is made to precontour the marking device for use on known complementary surfaces.

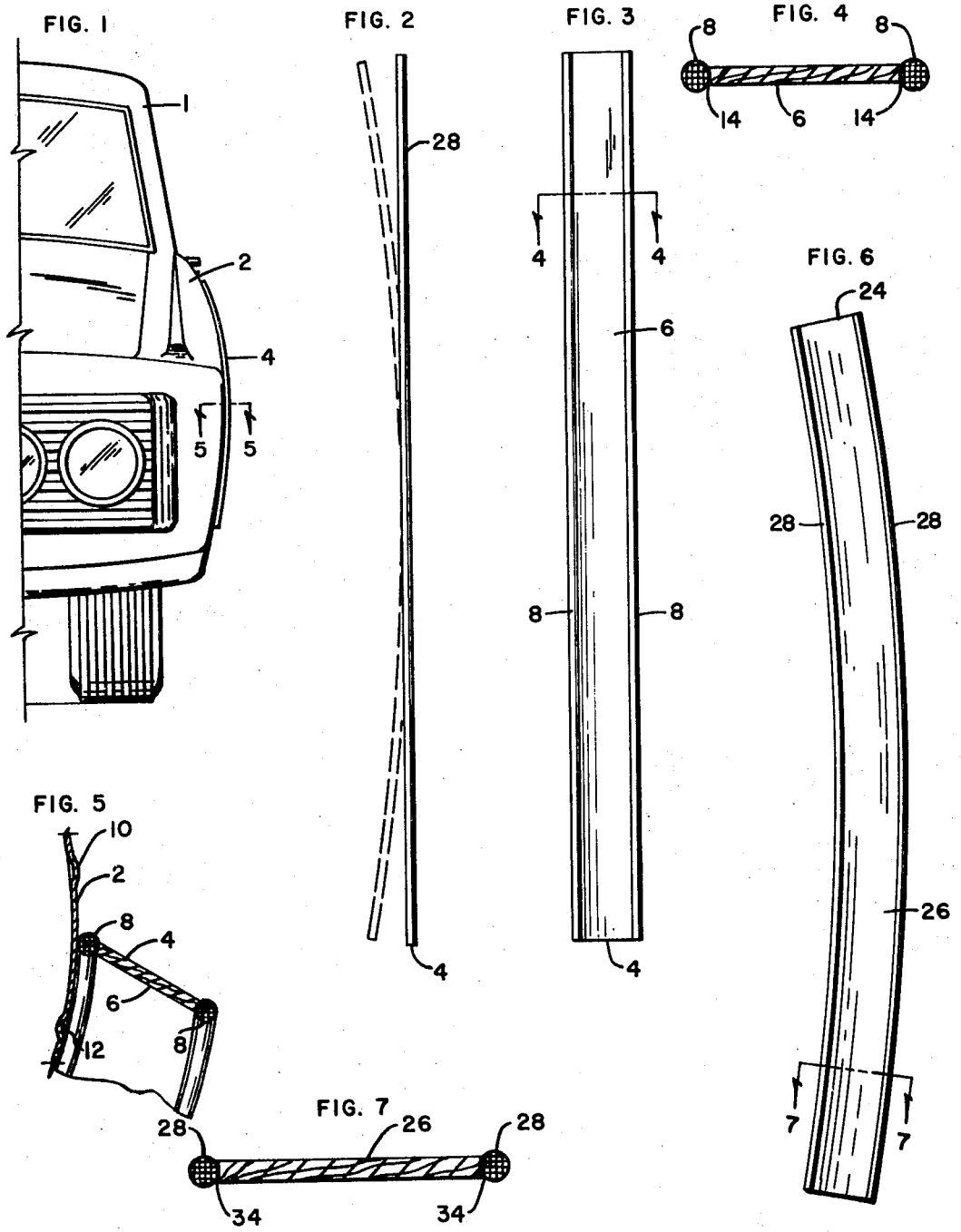

METHOD OF AND APPARATUS FOR DETECTING IRREGULARITIES IN A SURFACE

This invention relates to an apparatus for and a method of determining irregularities on rigid surfaces, whether plane, convex or concave, and primarily aids in locating irregularities on rigid sheet metal surfaces, such as vehicle bodies or other rigid surfaces on which it is desirable to obtain precision uniformity of the surface. The present marking device is so constructed as to enable an artisan to mark a plane or contoured rigid surface in such manner that the irregularities, such as high spots and low spots can be ascertained, and the proper steps can be taken to nullify such irregularities.

The present marking device is constructed with sufficient flexibility that an artisan can flex the device from a straight instrument to a curved instrument and by holding the instrument at an acute angle to the surface being acted upon, the surface may be acted upon and be properly marked to indicate the irregularities. The artisan can then take proper steps to smooth out the irregularities in a manner well known in the art of metal working and the like.

For use on certain contoured surfaces, the marking device may be precontoured, while the main portion of the device lies in a plane, and with the marking device precontoured to a specific surface, such as a particular panel or door of a vehicle, the marking device will not have to be held in a curve or angulated with respect to the surface to be acted upon.

The marking device is preferably constructed with a marking media, such as graphite, crayon of any desired color, chalk, or other marking substance which will rub off on the surface in heavier amounts on the "high" places, or will outline the recesses or "low" places therein, thereby enabling the artisan to identify the irregularities and to take such steps as are necessary to relieve the surface of such irregularities.

An object of this invention is to provide a method of determining, by marking, irregularities on a rigid surface.

Another object of the invention is to provide a marking device for transverse movement across a rigid surface, which may be flexed to fit the surface to be acted upon, whether the surface is plane, convex, or concave, thereby to indicate irregularities on the surface, so proper steps can be taken to make such surface uniformly smooth.

Still another object of the invention is to provide a marking device which has a marking media on at least one edge thereof.

A further object of the invention is to provide a marking means for marking rigid contoured surfaces, which marking means has a marking element on opposed longitudinal edges.

Yet another object of the invention is to provide a device for marking rigid surfaces to indicate irregularities therein, which is precontoured to enable the marking of contoured surfaces to indicate irregularities therein, without the necessity of flexing the marking element to conform to a contoured surface.

With these objects in mind and others which will become manifest as the description proceeds, reference is to be had to the accompanying drawings in which like reference characters designate like parts in the several views thereof, in which FIG. 1 is a fragmentary front elevational view of a motor vehicle, showing the present device fitted in contoured relation with a convex portion of the vehicle body;

FIG. 2 is an enlarged, longitudinal view of the marking device showing a side thereof in full outline in one position, with the flexed position thereof being shown in dashed outline, to show how an artisan can position the device to conform to the contours of a rigid surface to be acted upon;

FIG. 3 is a front, longitudinal elevational view of one form of the invention, on substantially the same scale as FIG. 2, with a marking element being shown on each side thereof;

FIG. 4 is a greatly enlarged sectional view of the device, taken on the line 4—4 of FIG. 3, looking in the direction indicated by the arrows, and showing the marking element on opposite sides thereof;

FIG. 5 is an enlarged fragmentary view taken on the line 5—5 of FIG. 1, looking in the direction indicated by the arrows;

FIG. 6 is an enlarged, longitudinal elevational view of a modified form of the invention in a predetermined contour, and showing a marking element on each side of the device; and FIG. 7 is a greatly enlarged sectional view taken on the line 7—7 of FIG. 6, looking in the direction indicated by the arrows, showing a marking media on each edge thereof.

With more detailed reference to the drawing, the numeral 1 designates generally a vehicle, which has a contoured body 2. The marking element is designated generally by the numeral 4, and in the form of the invention shown in FIGS. 1 through 4, has an elongated, substantially straight body portion 6, which body portion 6 has marking media 8 secured to opposite sides thereof. The elongated straight body 6 is relatively thin so it can be flexed transversely, substantially in the manner shown in dotted outline in FIG. 2. The combination of flexing the marking element, as shown in FIG. 2 and of angulating the elongated body portion 6 of the device, as shown in FIG. 5, the marking device is moved transversely over the surface, whether the surface be plane or contoured, as indicated in FIG. 2, with the marking media 8 in contact with the surface being acted upon, the "high" places 10 and the "low" places 12 will be indicated. The "high" places will receive a heavier deposit of the marking media and the "low" places will be surrounded by heavier deposits of the marking media, thus irregularities in the surface will become clearly evident, so that proper steps can be taken to make the surface uniformly smooth.

The marking media, which is secured to a longitudinal edge or edges of the elongated body may be graphite, crayon, in any color suitable for a particular application, colored or white chalk or other suitable marking material, which material is preferably secured to opposite longitudinal sides of the elongated body by a bonding media, as indicated at 14, FIG. 4.

The elongated body 6 may be of wood, plastic or other suitable material which may be flexed to conform to the contour of the surface, to enable the marking media 8, which is bonded thereto as indicated at 14, to deposit the graphite, chalk, crayon or the like on the "high" places 10 and to surround the "low" places 12, as the instrument is passed over the surface. This makes irregularities in the surface being acted upon readily evident, so the artisan can take the steps necessary to make the surface uniformly smooth, either leveling off the "high" spots or raising or filling in the "low" spots.

When the marking device is pressed against a surface, as indicated in FIGS. 1 and 5, with the marking edge conforming to the contour of the surface, and passed thereover, the irregularities in the surface are indicated, and when one marking edge has been used until the marking media becomes ineffective, the instrument may be turned edge for edge, thereby doubling the effective life of the instrument.

In the use of the device, the marking media 8 is deposited on the surface, and after considerable use, the marking media may become so depleted as to be ineffective, whereupon the artisan may discard the instrument and replace it with another, or the instrument may be returned for reinstallation of fresh marking media on opposite edges thereof. In this manner the unit may serve with maximum efficiency at a minimum cost.

The present device is particularly adaptable to vehicle bodywork, but it is to be understood that the use thereof is not limited to such work, as the instrument may be used in various metal arts, sculpture and in marking surfaces of any material where a uniformly plane or contoured surface is desired.

MODIFIED FORM OF THE INVENTION

A modified form of the invention is shown in FIGS. 6 and 7, wherein the marking device is designated generally by the numeral 24 and has an elongated body portion, as indicated at 26. The portion 26 may be precontoured to conform with a complementary contoured panel or surface, such as a portion of a vehicle body, and which body portion 26 has marking media 28 secured on opposite edges thereof, which marking media may be bonded to the respective edges of the body 26 by a suitable bonding agent 34. This form of the device may thus perform the marking of a specific contour. With this form of the invention, a minimum of experience, on the part of the artisan, is required to perform the proper marking to indicate the irregularities in the surface being acted upon.

Having thus clearly shown and described the invention, what is claimed as new and desired to be secured by Letters Patent is:

1. A marking means for indicating irregularities on a rigid surface, which marking means comprises;
    a. an elongated, self-supporting, flexible body,
        1. said elongated body having marking media secured to a longitudinal side thereof, and
        2. said elongated, flexible body being movable transversely over the rigid surface to test for irregularities thereon so as to deposit marks, by said marking media, with respect to said irregularities on the rigid surface.
2. A marking means for indicating irregularities on a rigid surface, as defined in claim 1; wherein
    a. said elongated, self-supporting, flexible body has marking media on opposed sides thereof.
3. A marking means for indicating irregularities on a rigid surface, as defined in claim 1; wherein
    a. said marking media is bonded to the longitudinal sides of said elongated, self-supporting, flexible body.
4. A marking means for indicating irregularities on a rigid surface, as defined in claim 1; wherein
    a. said marking media is colored, to define irregularities in a surface of contrasting color.
5. A marking means for indicating irregularities on a rigid surface, as defined in claim 1; wherein
    a. said elongated, self-supporting, body is sufficiently thin as to be flexible.
6. A marking means for indicating irregularities on a rigid surface, as defined in claim 1; wherein
    a. said elongated, self-supporting, flexible body is precontoured to conform to a contoured surface.
7. A marking means for indicating irregularities on a rigid surface, as defined in claim 1; wherein
    a. said elongated, self-supporting, body is formed of flexible material.